US009883172B2

(12) United States Patent
Engelbert et al.

(10) Patent No.: US 9,883,172 B2
(45) Date of Patent: Jan. 30, 2018

(54) ACTIVE 3D TO PASSIVE 3D CONVERSION

(75) Inventors: Joshua Engelbert, Highlands Ranch, CO (US); Barrett Thur, Thornton, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 677 days.

(21) Appl. No.: 13/251,878

(22) Filed: Oct. 3, 2011

(65) Prior Publication Data

US 2013/0083164 A1 Apr. 4, 2013

(51) Int. Cl.
H04N 9/47 (2006.01)
G06K 9/00 (2006.01)
H04N 13/04 (2006.01)
H04N 13/00 (2006.01)

(52) U.S. Cl.
CPC ..... H04N 13/0431 (2013.01); H04N 13/0007 (2013.01); H04N 13/0029 (2013.01)

(58) Field of Classification Search
CPC .................. H04N 13/0029; H04N 13/0431
See application file for complete search history.

(56) References Cited

U.S. PATENT DOCUMENTS

| | | | | |
|---|---|---|---|---|
| 6,552,697 B1* | 4/2003 | Oluta | ................. | H04N 13/0275 345/32 |
| 6,956,964 B2* | 10/2005 | Lee et al. | ...................... | 382/154 |
| 2002/0021832 A1* | 2/2002 | Dawson | ............ | G02B 27/2207 382/154 |
| 2002/0085089 A1* | 7/2002 | McLaine et al. | ............... | 348/47 |
| 2005/0225630 A1* | 10/2005 | Childers | ............ | H04N 13/0044 348/51 |
| 2007/0183650 A1* | 8/2007 | Lipton | ..................... | G06T 3/00 382/154 |
| 2008/0151193 A1* | 6/2008 | Reder | ................................ | 353/7 |
| 2010/0208044 A1* | 8/2010 | Robinson et al. | .............. | 348/53 |
| 2011/0032330 A1* | 2/2011 | Kim et al. | ....................... | 348/43 |
| 2011/0141240 A1* | 6/2011 | Dutta | ................. | H04N 13/0022 348/47 |
| 2011/0205625 A1* | 8/2011 | Auld | ..................... | G02B 27/26 359/465 |
| 2011/0234760 A1* | 9/2011 | Yang | .................. | H04N 13/0048 348/46 |
| 2011/0242288 A1* | 10/2011 | Francisco | ........................ | 348/51 |
| 2012/0019634 A1* | 1/2012 | Jian | ................................ | 348/54 |
| 2012/0038754 A1* | 2/2012 | Na | ................................ | 348/51 |
| 2012/0050271 A1* | 3/2012 | Ra et al. | ........................ | 345/419 |
| 2012/0069015 A1* | 3/2012 | Han et al. | ..................... | 345/419 |
| 2012/0102435 A1* | 4/2012 | Han et al. | ..................... | 715/848 |

(Continued)

*Primary Examiner* — Joseph Ustaris
*Assistant Examiner* — Rebecca Volentine
(74) *Attorney, Agent, or Firm* — Kilpatrick Townsend & Stockton LLP

(57) ABSTRACT

Various arrangements for using an active 3D signal to create passive 3D images are presented. An active 3D frame may be received. The active 3D frame may comprise a first perspective image and a second perspective image. The first perspective image may be representative of a different perspective than the second perspective image. The first perspective image may be tinted with a first color. The second perspective image may be tinted with a second color different from the first color. The first perspective image tinted with the first color may be displayed. The second perspective image tinted with the second color may be displayed.

19 Claims, 8 Drawing Sheets

(56) References Cited

U.S. PATENT DOCUMENTS

| | | | |
|---|---|---|---|
| 2012/0154526 A1* | 6/2012 | Ji et al. ........................... | 348/43 |
| 2012/0249736 A1* | 10/2012 | Barrett ............... | H04N 13/0029 |
| | | | 348/43 |
| 2012/0257011 A1* | 10/2012 | Mengwasser ................... | 348/43 |
| 2013/0009947 A1* | 1/2013 | Chen ............................ | 345/419 |

* cited by examiner

ACTIVE 3D TO PASSIVE 3D CONVERSION

BACKGROUND

Certain varieties of three-dimensional (3D) television require the use of "active" 3D glasses in order to view displayed content in 3D. Active 3D glasses may be worn by a person (referred to as an "end-user") when watching an active 3D television for a 3D viewing experience. Such active 3D glasses may tend to be expensive (as compared to "passive" 3D glasses) and/or cumbersome. Further, since the use of such active 3D glasses may be necessary in order to view active 3D content on an end-user display device (e.g., a television), each end-user desiring to watch active 3D content at the same time may need to wear a pair of active 3D glasses that are compatible with the active 3D television being used. When an end-user has a viewing event for multiple people (e.g., a movie premier event or a Super Bowl party), the end-user may not have access to enough pairs of active 3D glasses for all of his or her guests and/or may be reluctant to purchase additional active 3D glasses when the additional active 3D glasses will only be needed for a limited period of time (e.g., the duration of the viewing event).

SUMMARY

Various methods, systems, apparatuses, and computer programs for using an active 3D frame to create a passive 3D image are described. In some embodiments, a method for using an active 3D frame to create a passive 3D image is presented. The method may include receiving, by a tuner device, the active 3D frame. The active 3D frame may comprise a first perspective image and a second perspective image. The first perspective image may be representative of a different perspective than the second perspective image. The method may include tinting the first perspective image with a first color. The method may include tinting the second perspective image with a second color, wherein the first color is different from the second color. The method may include causing the first perspective image tinted with the first color to be displayed. The method may include causing the second perspective image tinted with the second color to be displayed.

In some embodiments, one or more of the following may be present: Causing the second perspective image tinted with the second color to be displayed may occur after the first perspective image tinted with the first color has been displayed. The first perspective image tinted with the first color and the second perspective image tinted with the second color may be caused to be displayed in succession such that the first perspective image tinted with the first color and the second perspective image tinted with the second color appear displayed concurrently to an end-user. The first color may match a first lens's color of a first lens, the first lens being part of a pair of passive 3D glasses configured to be worn by an end-user. The second color may match a second lens's color of a second lens, the second lens being part of the pair of passive 3D glasses configured to be worn by the end-user. The method may include receiving input that indicates the first lens's color. The method may include receiving input that indicates the second lens's color. The method may include selecting the first color based on the input that indicates the first lens's color. The method may include selecting the second color based on the input that indicates the second lens's color. The method may include scaling the first perspective image tinted with the first color for display by an end-user display device. The method may include scaling the second perspective image tinted with the second color for display by the end-user display device. Causing the first perspective image tinted with the first color to be displayed may comprise transmitting a first set of information to an end-user display device not configured to display in active 3D. Causing the second perspective image tinted with the second color to be displayed may comprise transmitting a second set of information to the end-user display device not configured to display in active 3D.

In some embodiments, a system configured to use an active 3D frame to create a passive 3D image may be presented. The system may include a tuner device communicatively coupled with an end-user display device configured to receive the active 3D frame. The active 3D frame may comprise a first perspective image and a second perspective image, the first perspective image representative of a different perspective than the second perspective image. The tuner device may be configured to tint the first perspective image with a first color. The tuner device may be configured to tint the second perspective image with a second color, wherein the first color is different from the second color. The tuner device may be configured to transmit the first perspective image tinted with the first color to the end-user display device. The tuner device may be configured to transmit the second perspective image tinted with the second color to the end-user display device.

In some embodiments, a computer-readable medium comprising instructions may be presented. The instructions may be configured to cause a computer to receive an active 3D frame. The active 3D frame may comprise a first perspective image and a second perspective image, the first perspective image representative of a different perspective than the second perspective image. The instructions may be configured to cause a computer to tint the first perspective image with a first color. The instructions may be configured to cause a computer to tint the second perspective image with a second color, wherein the first color is different from the second color. The instructions may be configured to cause a computer to transmit the first perspective image tinted with the first color to an end-user display device. The instructions may be configured to cause a computer to transmit the second perspective image tinted with the second color to the end-user display device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
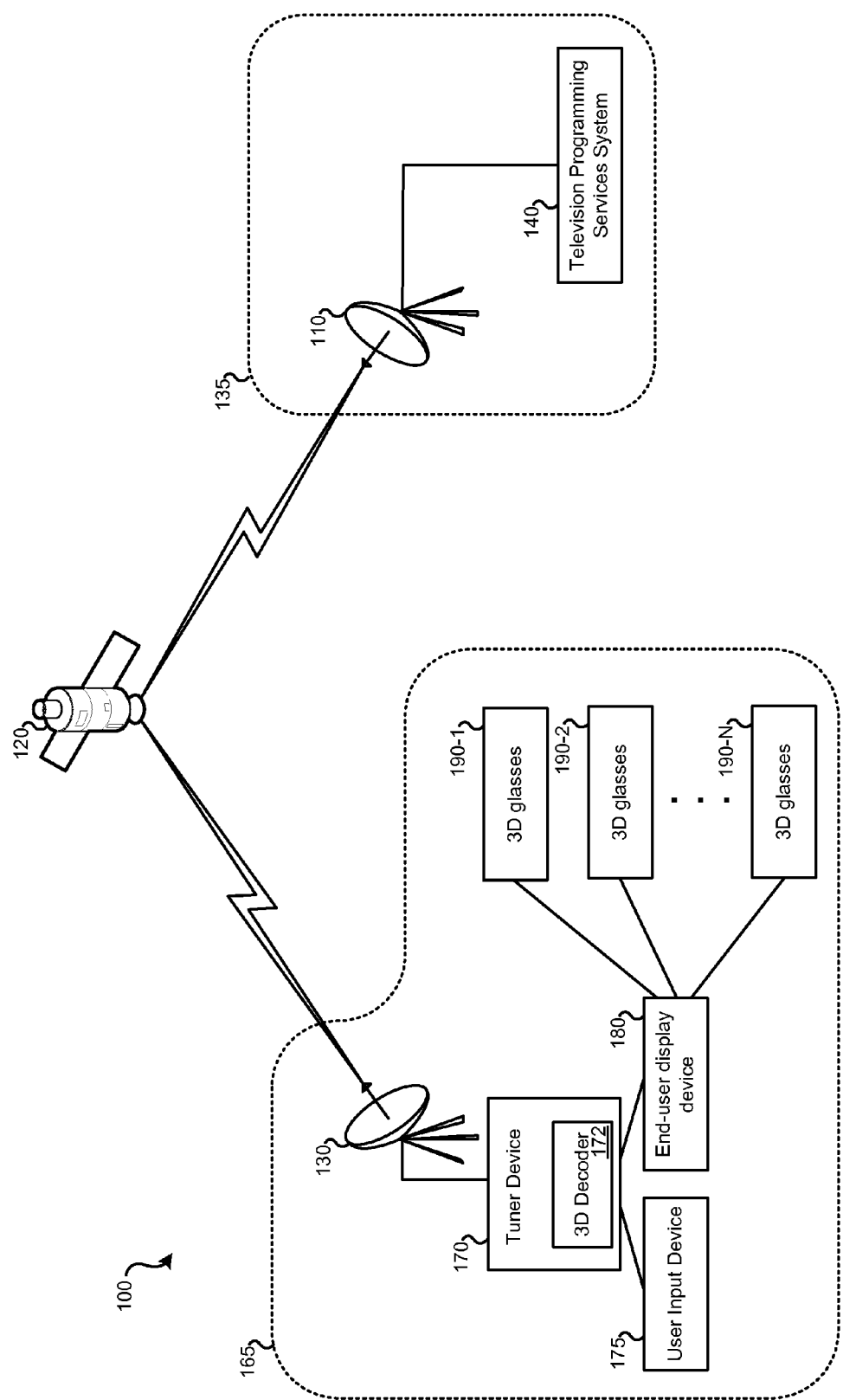
FIG. 1 illustrates an embodiment of a system configured to use an active 3D signal to create passive 3D images.

Multiple varieties of three-dimensional (3D) television exist. Two of these varieties are "active" 3D television and "passive" 3D television. Both of these varieties of 3D television may require eyewear configured to enable 3D television viewing. The eyewear required for active 3D television viewing may be significantly different from the eyewear required for passive 3D television viewing.

For active 3D television, two frames may appear in quick succession on an end-user display device, such as a television. One frame may serve as the perspective of the end-user's first eye and the second frame may serve as the perspective of the end-user's second eye. As such, a pair of active 3D glasses may be used to block the view of the television of the end-user's eye not intended to view a particular image. Accordingly, only one of the end-user's eyes may see a displayed image. Because the images may be displayed in quick succession, the images having the different perspectives appear displayed simultaneously to the end-user and may provide a 3D viewing effect.

Since a pair of active 3D glasses may block the view of one of the end-user's eyes while a particular image is being displayed, the active 3D glasses may require a power source, an electronic control circuit, lenses configured to alternate between being transparent and opaque, and a (wireless) receiver. The receiver may be used by the active 3D glasses to synchronize with the active 3D television such that the proper eye of the end user is blocked from viewing a particular displayed image. The on-board electronics of the active 3D glasses may control which lens of the active 3D glasses is transparent (thus allowing a first eye of the end-user to view the active 3D television) and which is opaque (thus blocking a second eye of the end-user from seeing the active 3D television). Which lens of the pair of active 3D glasses is opaque or transparent may switch rapidly such that the end-user has the perceived effect of both eyes simultaneously viewing the active 3D television.

In passive 3D television, rather than a pair of glasses "actively" blocking each of the end-user's eyes in rapid succession, a passive filter is used to block images displayed by a passive 3D television (which may be a television also configured to provide active 3D television). Embodiments of passive 3D glasses may use colored (or tinted) lenses. For example, a pair of passive 3D glasses may have one lens that allows a particular color to pass (e.g., tinted blue) and another lens that permits a different color to pass (e.g., tinted red). As such, entities that appear tinted red on the passive 3D television will only be seen by one eye of the end-user, while entities tinted blue will only be seen by the end-user's other eye. The end-user may appear to observe entities displayed by the passive 3D television in 3D because each of the end-user's eyes are viewing different images, as filtered by the passive 3D glasses.

Passive 3D glasses may rely on tinted lenses. Passive 3D glasses then may contain no electronics, lenses that can be electronically switched between opaque and transparent, power sources, or receivers as may be found in active 3D glasses. Due to these differences and/or other factors (e.g., market demand), active 3D glasses may be more expensive than passive 3D glasses. As such, in some or all situations, an end-user may prefer to use passive 3D glasses rather than active 3D glasses.

An example of a situation where an end-user may prefer passive 3D over active 3D, is where an unusually high number of end-users desire to watch 3D television together concurrently. A first end-user may typically watch active 3D television alone. To do this, the first end-user may have one pair of active 3D glasses. However, if a second end-user desires to watch 3D television with the first end-user, the second end-user would require his or her own pair of active 3D television glasses compatible with the active 3D television. This problem is exacerbated if the first end-user has multiple other end-users in attendance to watch 3D television, such as a special sporting or pay-per view event or to watch a movie. If the other end-users do not have their own compatible active 3D glasses, and the first end-user does not desire to purchase additional pairs of active 3D glasses for use by the other end-users, the group of end-users may not be able to watch active 3D television concurrently.

While the first end-user may be reluctant to acquire additional pairs of potentially expensive active 3D glasses, passive 3D glasses may be significantly less expensive, and thus it may be more reasonable for the first end-user (or other end-users) to purchase. This may be especially true for a limited period of use (e.g., a single viewing event). Therefore, while an end-user may desire to watch active 3D television when alone or as part of a small group of end-users, the end-user may also desire to have the ability to switch to passive 3D television for viewing by larger groups of end-users. To accomplish this, a single television may be made to accommodate both active and passive 3D television viewing via the systems and methods discussed herein.

In some embodiments, an active 3D television signal may be converted and displayed in a passive 3D format for 3D viewing by one or more end-users who are viewing an end-user display device using passive 3D glasses. In these embodiments, an active 3D frame may be received, where the active 3D frame may be one frame in a series of frames used to display video. For example, 60 frames may be received every second. Each of these frames may contain two images to be displayed in series. Each of these images may be different perspective views of a common scene to be displayed by a 3D television. As such, each image of the frame may correspond to either a perspective view of the left or right eye of end-users.

In some embodiments, the active 3D frame may be processed such that they are viewable in 3D using passive 3D glasses rather than active 3D glasses. Each image present in the 3D frame may be tinted a different color. The images may be tinted colors to correspond with colors of the lenses of an end-user's passive 3D glasses. In some embodiments, the lenses of the passive 3D glasses are red and blue; however, other color combinations of tints may be possible.

A first image from the active 3D frame (which represents one eye's perspective) may be displayed tinted the first color. This image, due to the filtering of the passive 3D glasses, may be more visible (or only visible) to one of the end-user's eyes. A second image from the active 3D frame (which represents the other eye's perspective) may be displayed tinted with the second color. This image, also due to the filtering of the passive 3D glasses, may be more visible (or only visible) to the end-user's other eye. These two images having different tints may be displayed concurrently or in rapid succession such that both images appear displayed concurrently to the end-user. By each image having slightly different perspectives, the end-user may appear to view the passive 3D image displayed by the end-user display device in 3D. This process may be repeated rapidly for video, for example 30, 60, or 120 times per second. Other numbers of frames per second may be possible.

In some embodiments, the end-user may be able to configure whether the television displays in active 3D or converts to passive 3D for display. The end-user may be able to configure the conversion to passive 3D to accommodate the passive 3D glasses of the end-user (e.g., adjust for variations in the shade of the lenses of the passive 3D glasses and/or television).

FIG. 1 illustrates an embodiment of a system 100 configured to use an active 3D signal to create passive 3D images. System 100 may include: uplink station 110, television programming services system 140, satellite 120, end-user equipment 130, tuner device 170 (which may execute 3D decoder 172), user input device 175, end-user display device 180, and 3D glasses 190 (which may be active or passive). In some embodiments, more or fewer components may be present.

In some embodiments, a satellite-based television service, such as direct broadcast satellite (DBS) service, is used to deliver television services to end-users. DBS service may involve television channels and/or other content (e.g., on-demand programming) being transmitted via a satellite uplink and multiple downlinks to end-user equipment configured to receive such satellite transmissions. A single uplink (or multiple uplinks) may be used to deliver television channels and other content to a large number of end-users. In system 100, only a single set of end-user equipment is illustrated for simplicity. For example, end-user system 165 may contain the components present at an end-user's home or business. It should be understood that system 100 may be used to deliver television channels and other content to many end-users, which may involve the use of many end-user systems similar to end-user system 165.

In system 100, uplink station 110 is configured to transmit one or more television channels, audio, video content, and/or images (collectively referred to as "content") to satellite 120. Some or all of these television channels, video content, and/or images may be transmitted as an active 3D signal ("active 3D content"). Such active 3D content may comprise a series of frames. Each frame may contain two images, each image representing a perspective for an end-user's eye. This pair of images may be intended to be displayed to the end-user in rapid succession such that the pair of images appears displayed concurrently to the end-user. Satellite 120 may serve to relay content received from uplink station 110 to a plurality of sets of end-user equipment such as end-user equipment 130. Satellite 120 may be located in geosynchronous orbit to provide continuous coverage to a particular geographic area.

Television programming services system 140 may represent one or more computer systems that are configured to provide content to uplink station 110 to be delivered to end-user equipment. Television service provider 135 may own, manage, and/or operate uplink station 110 and/or television programming services system 140. In some embodiments, some of these components may be owned and/or operated by entities other than television service provider 135.

End-user equipment 130 may be configured to receive DBS television service, including active 3D content. The downlink from satellite 120 to end-user equipment 130 may be unidirectional. As such, while signals may be transmitted from satellite 120 to end-user equipment 130, signals may not be transmitted from end-user equipment 130 to satellite 120. While information may be received by end-user equipment 130 from television service provider 135 via satellite 120, it may not be possible to use the same communication link to transmit information back to television service provider 135. In some embodiments, the satellite communication link may be bidirectional.

End-user equipment 130 may include one or more satellite dishes configured to receive content, including active 3D content, from satellite 120. In some embodiments, end-user equipment 130 may include a single satellite dish equipped with multiple tuners. In some embodiments, a single tuner is connected with a satellite dish. In system 100, a single tuner device, tuner device 170, is illustrated as connected with end-user equipment 130. It should be understood that in other embodiments end-user equipment 130 may be connected with multiple tuner devices.

Tuner device 170 (also referred to as a tuner device) may serve as an interface between the signals (which may contain content and active 3D content) received from satellite 120 by end-user equipment 130 and end-user display device 180. Tuner device 170 may be configured to receive, analyze, and transmit information received from satellite 120 by end-user equipment 130 to end-user display device 180. Tuner device 170 may be configured to convert active 3D content (which includes frames) to passive 3D. Tuner device 170 may execute 3D decoder 172 as either software or firmware to perform such active to passive conversion. 3D decoder 172 may also be implemented via hardware integrated as part of tuner device 170 or as a stand-alone device. Tuner device 170 may be a standalone piece of equipment, such as a set-top box. In some embodiments, tuner device 170 may be incorporated as part of another device, such as a television (or some other form of end-user display device 180). Tuner device 170 may communicate with multiple other pieces of equipment, such as user input device 175 and end-user display device 180.

End-user display device 180 may be a device that is used to present content (including active 3D content) to end-users. Such television channels, video content, and/or images may be presented using active 3D or passive 3D by the end-user display device. Examples of possible end-user display devices include: televisions, computer systems, and handheld wireless devices. User input device 175 may represent controls that are integrated with tuner device 170. User input device 175 may also be a remote control that allows the user to interact with tuner device 170. As an example, user input device 175 may permit an end-user to interact with tuner device 170 by end-user display device 180. In some embodiments, end-user display device 180 is not configured to display in active 3D; however, such an end-user display device may be configured to display passive 3D by converting active 3D frames to passive 3D.

End-user display device 180 may be able to display images for use with active 3D glasses and/or passive 3D glasses. As illustrated, three pairs of 3D glasses 190 are used in conjunction with end-user display device 180. 3D glasses 190 may be active 3D glasses or may be passive 3D glasses. If 3D glasses 190 are active 3D glasses, the active 3D glasses may be configured to receive a synchronization signal from end-user display device 180 (or some other device). Further, if 3D glasses 190 are active when worn, 3D glasses 190 may be configured to permit only one eye of an end-user to view end-user display device 180 at a given time. Each lens of active 3D glasses 190 may alternate between being at least approximately opaque and at least approximately transparent. Due to the speed and frequency at which each lens of active 3D glasses may transition between opaque and transparent, an end-user using a pair of active 3D glasses 190 may not observe that his or her eyes are being alternatively blocked.

If 3D glasses 190 are passive 3D glasses, no communication between end-user display device 180 and 3D glasses 190 is present. Each lens of a pair of passive 3D glasses may be a different color or tint. In some embodiments, one lens of a pair of passive 3D glasses is blue, while the other lens is red. Other color combinations may be possible.

In system 100, content (including active 3D content) is delivered to end-users via a direct broadcast satellite arrangement. However, it should be understood that embodiments of this invention may pertain to other forms of televised content delivery. For example, cable television, which utilizes a cable network, may utilize similar arrangements as discussed herein for converting active 3D content to passive 3D. Similarly a fiber-based television network and/or IP-based television network may utilize various arrangements for converting active 3D content to passive 3D as described herein.

Figure 2:
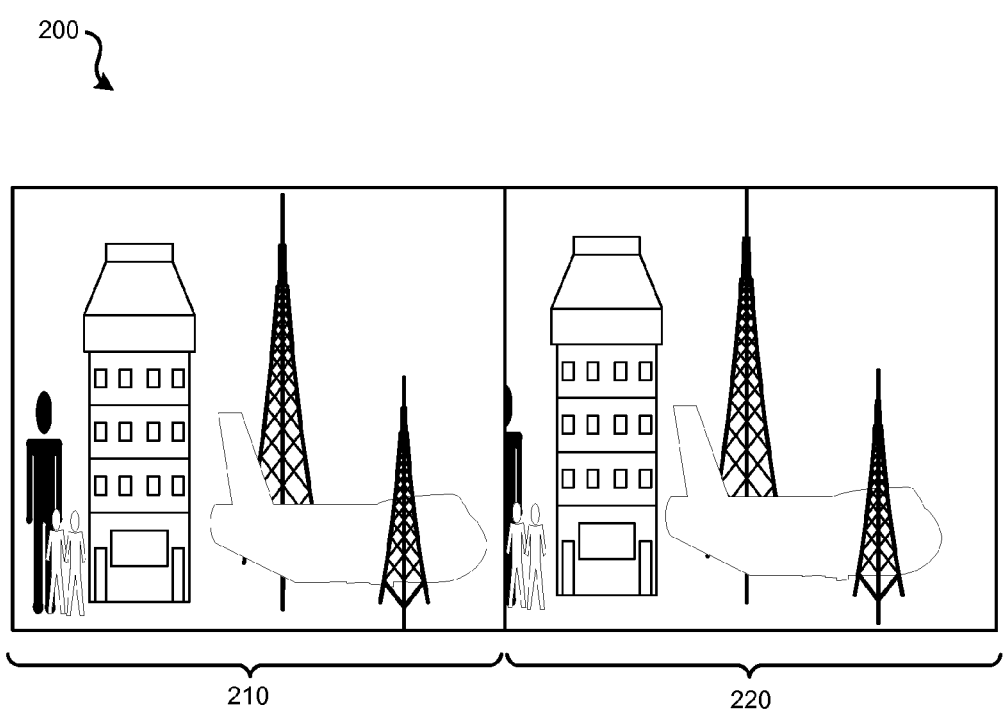
FIG. 2 illustrates an embodiment of an active 3D frame.

FIG. 2 illustrates an embodiment of an active 3D frame 200. Referring to system 100 of FIG. 1, active 3D frame 200 may be received by tuner device 170 via end-user equipment 130 and satellite 120 from television service provider 135. Active 3D frame 200 may be part of an active 3D television signal being transmitted by television service provider 135. An active 3D television signal may include multiple frames per second, such as 30 or 60 frames per second.

Active 3D frame 200 includes two images: image 210 and image 220. Each of these images represents a different perspective view. These perspective views may be intended to simulate the perspectives that each of a viewer's eyes would have when viewing a scene. As such, each image may contain substantially the same subject matter, but may appear captured from slightly different perspectives.

Image 210 and image 220 may be compressed such that both images can fit into a single frame. In some embodiments, in order to fit two images into a single frame, the horizontal resolution of each image may be halved. As such, prior to display to an end-user, each image may be rescaled horizontally. In active 3D frame 200, image 210 is horizontally adjacent to image 220. It should be understood that in other embodiments of an active 3D frame, image 210 may be located vertically adjacent to image 220. If image 210 is located vertically adjacent to image 220, each image may need to be rescaled vertically (rather than horizontally) prior to display to an end-user.

Figure 3:
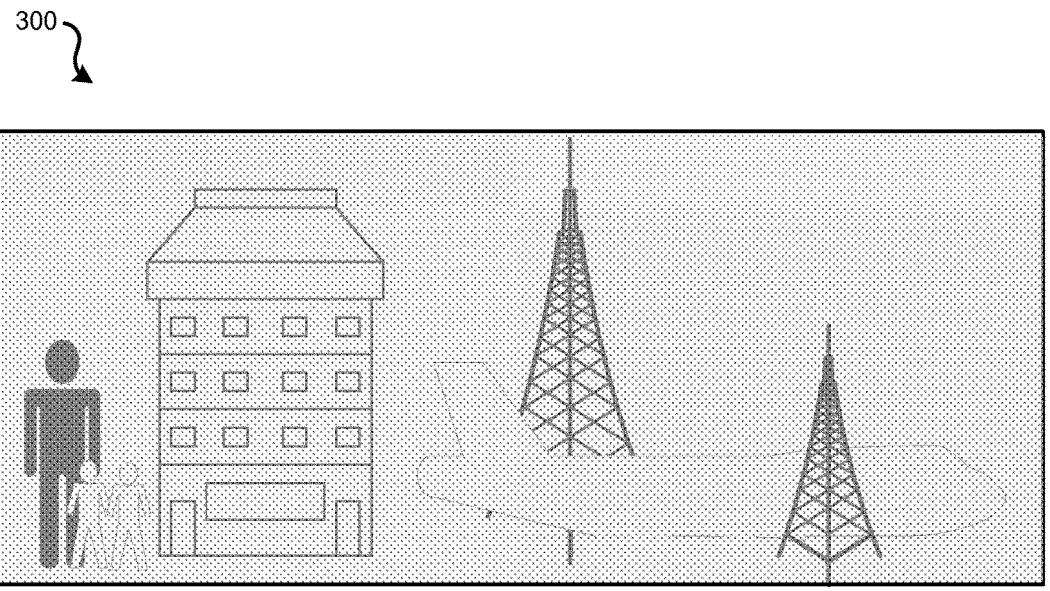
FIG. 3 illustrates an embodiment of a passive 3D image created from an active 3D frame.

FIG. 3 illustrates an embodiment of a tinted image 300 of a passive 3D image created from an active 3D frame. Tinted image 300 may be based on active 3D frame 200. More specifically, tinted image 300 may be based on one of the images of active 3D frame 200, such as image 210. Tinted image 300 may be rescaled to display properly on an end-user display device. Tinted image 300 may be tinted with a color such that it will be visible through a particular lens of a pair of passive 3D glasses, but may be less visible through the other lens of the passive 3D glasses. As an example, tinted image 300 may be tinted red if one lens of the passive 3D glasses is tinted red and the other lens is tinted blue.

Figure 4:
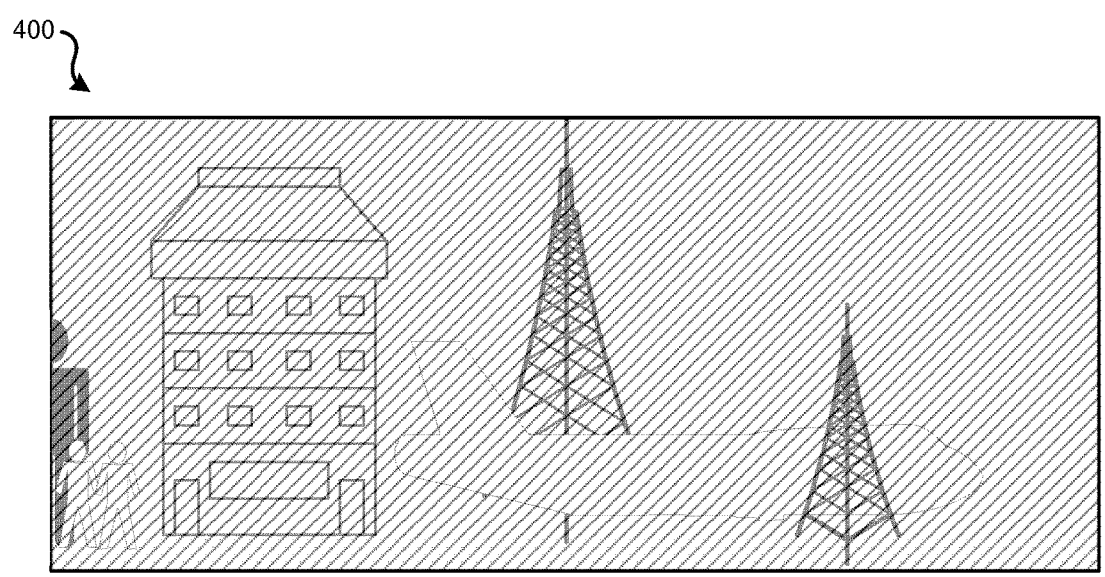
FIG. 4 illustrates an embodiment of a passive 3D image created from the same active 3D frame as FIG. 3.

FIG. 4 illustrates an embodiment of a tinted image 400 of a passive 3D image created from an active 3D frame. Tinted image 400 may be based on active 3D frame 200. More specifically, tinted image 400 may be based on an image of active 3D frame 200, such as image 220. (As such, tinted image 300 may be based on one of the images of active 3D frame 200, while tinted image 400 is based on the other image of active 3D frame.) Tinted image 400 may be rescaled to display properly on an end-user display device. Tinted image 400 may be tinted with a color such that it will be visible through a particular lens of a pair of passive 3D glasses, but may be less visible through the other lens of the passive 3D glasses. As an example, tinted image 400 may be tinted blue if a pair of passive 3D glasses has red and blue lenses. While tinted image 300 may be more visible through the first lens of the pair of passive 3D glasses, tinted image 400 may be more visible through the second lens of the same pair of passive 3D glasses.

Tinted image 300 and tinted image 400 may be displayed in rapid succession by an end-user display device, such as a television. An end-user wearing passive 3D glasses may appear to view both tinted image 300 and tinted image 400 at the same time due to each tinted image being displayed in rapid succession for a short period of time. For example, tinted image 300 and tinted image 400 may be part of a sequence of 30 or 60 images that are displayed to the end-user by the end-user display device every second. Therefore, for every active 3D frame received, two tinted images may be displayed by an end-user display device. In some embodiments, rather than presenting one of the tinted images followed by the other tinted image in rapid succession, tinted image 300 and tinted image 400 may be displayed concurrently. In such embodiments, for each active 3D frame received, a single image may be displayed by an end-user display device.

Figure 5:
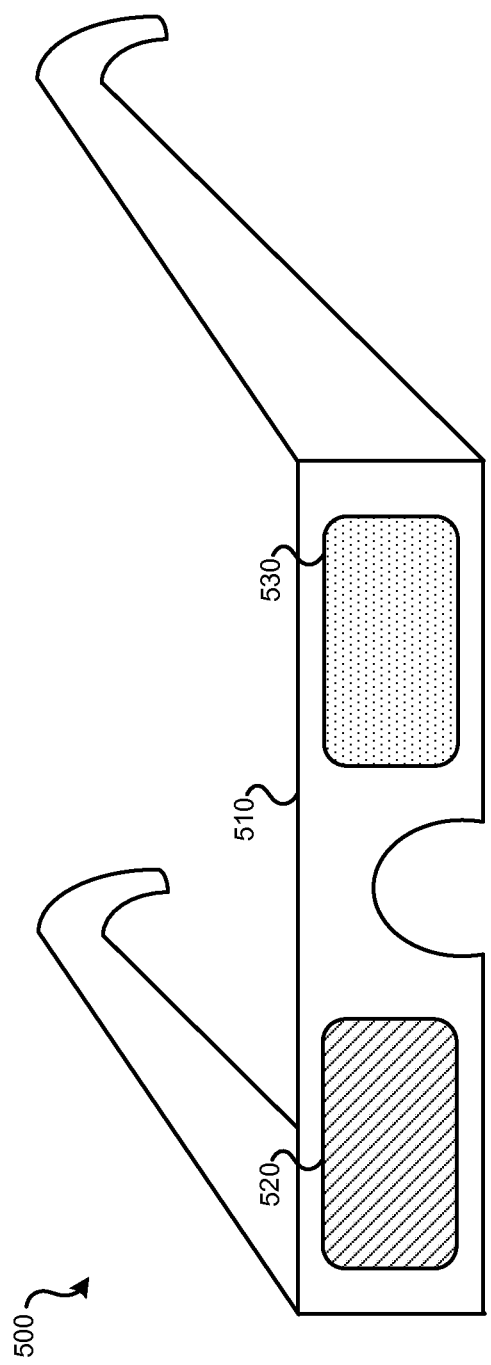
FIG. 5 illustrates an embodiment of a pair of passive 3D glasses.

FIG. 5 illustrates an embodiment of a pair of passive 3D glasses 500. Passive 3D glasses 500 may contain two lenses: lens 520 and lens 530. Each of these lenses may filter a different color. For example, lens 520 may be tinted blue and lens 530 may be tinted red. The lenses may be glass, plastic, or any other material suitable to serve as lenses. Lens 520 and lens 530 may be held in place by frame 510. Frame 510 may secure lens 520 and lens 530 together and allow passive 3D glasses 500 to be worn by an end-user. Passive 3D glasses 500 may have no electronics, power source, or receiver.

Figure 6:
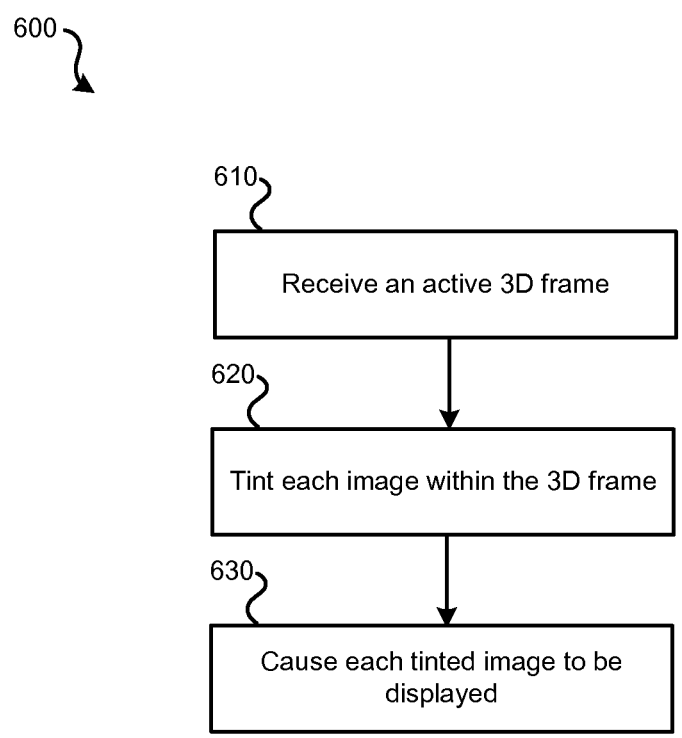
FIG. 6 illustrates an embodiment of a method for using an active 3D frame to create a passive 3D image.

System 100 may be used to convert an active 3D frame (such as active 3D frame 200 of FIG. 2) into images suitable for passive 3D (tinted image 300 of FIG. 3 and tinted image 400 of FIG. 4) such that the images can be displayed by an end-user display device and viewed in 3D by an end-user using passive 3D glasses (such as passive 3D glasses 500 of FIG. 5). Various methods may be used to perform such conversion. FIG. 6 illustrates an embodiment of a method 600 for using an active 3D frame to create a passive 3D image. Method 600 may be performed by system 100. Alternatively, method 600 may be performed by some other system that is configured to use an active 3D frame to create passive 3D images for display on an end-user display device. More specifically, each step of method 600 may be performed by a tuner device executing 3D decoder 172. Referring to system 100, method 600 may be performed by tuner device 170. Method 600 may also be performed by some other type of tuner device.

At step 610, an active 3D frame may be received by a tuner device. Referring to system 100 of FIG. 1, the active 3D frame may be received from television programming services system 140 via satellite 120 and end-user equipment 130 by tuner device 170. An active 3D frame may be active 3D content. In these or other embodiments, a tuner device may receive the active 3D frame via broadcast television or a cable network. The active frame received at step 610 may be similar in format to active 3D frame 200 of FIG. 2. The received active frame may contain two images captured from different perspectives of the same scene. The two images may be horizontally adjacent. In some embodiments, the two images of the active 3D frame may be vertically adjacent. Other arrangements of images within an active 3D frame may also be possible.

At step 620, each image within the 3D frame may be tinted. Each image may be tinted a different color. The colors used for tinting may be red and blue. As such, one image of the active 3D frame received at step 610 may be tinted red, while the other image of the active 3D frame received at step 610 may be tinted blue. In other embodiments, other colors may be used for tinting. The colors used for tinting may correspond to the colors of the lenses of a pair of passive 3D glasses to be used to view the passive 3D image.

At step 630, each of the images tinted at step 620 may be displayed by an end-user display device. Step 630 may include a tuner device transmitting each of the tinted images to an end-user display device. Each of the tinted images may be displayed concurrently (e.g., by the images overlaying each other). In some embodiments, the tinted images are displayed sequentially. For example, one of the tinted images may be displayed followed by the other tinted image. The tinted images may be displayed in rapid succession such that the images appear to be displayed concurrently to an end-user as a single passive 3D image. By the images appearing to be displayed concurrently to the end-user, and each eye of the end-user seeing a different image (due to the filtering by the colored lenses of the end-user's passive 3D glasses), the end-user may view the scene of the received active 3D frame in passive 3D similar to how the end-user would have viewed the active 3D frame using active 3D glasses.

Figure 7:
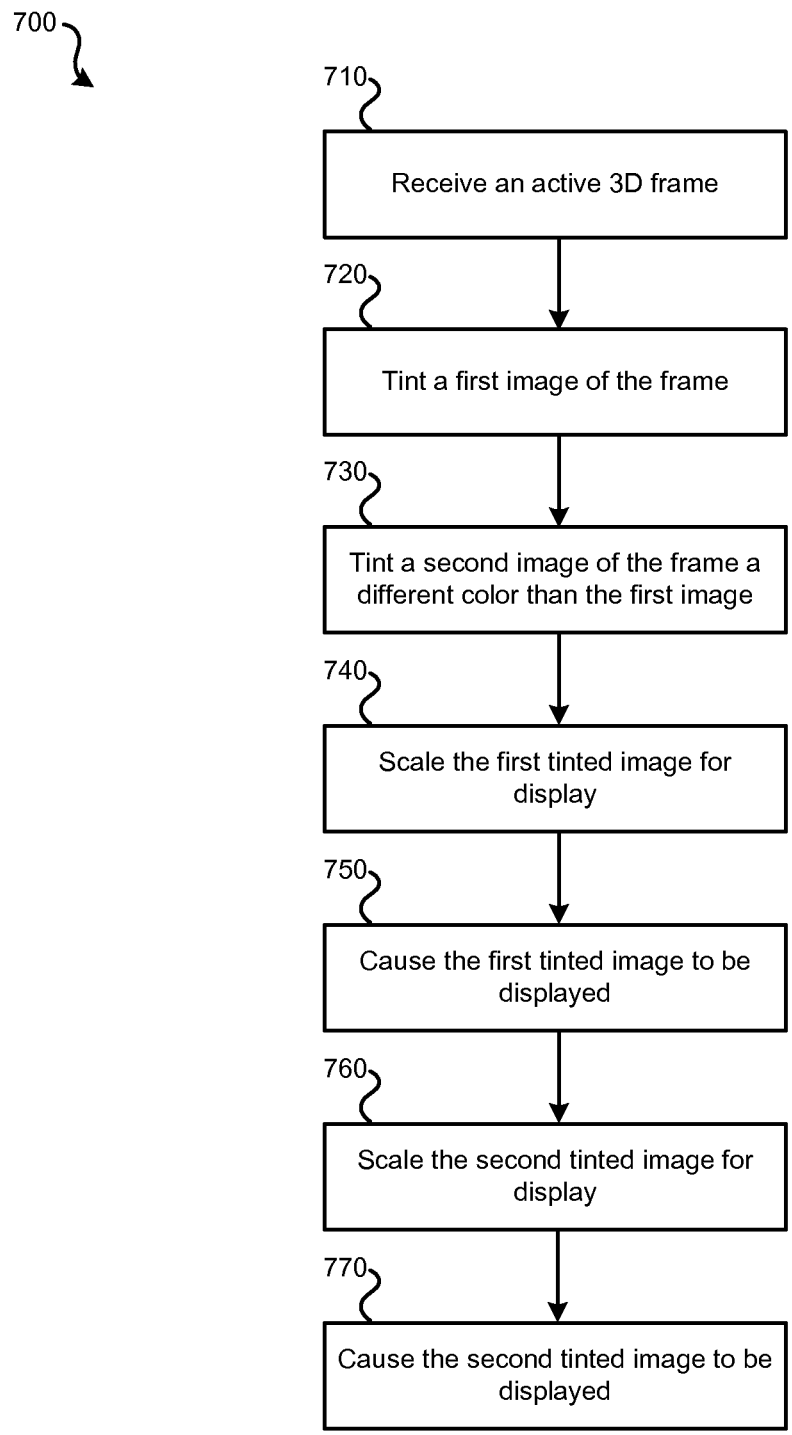
FIG. 7 illustrates another embodiment of a method for using an active 3D frame to create a passive 3D image.

FIG. 7 illustrates another embodiment of a method for using an active 3D frame to create a passive 3D image. Method 700 may be performed by system 100. Alternatively, method 700 may be performed by some other system that is configured to use an active 3D frame to create a passive 3D image as displayed on an end-user display device. More specifically, each step of method 700 may be performed by a tuner device. Referring to system 100, method 700 may be performed by tuner device 170 which may be executing 3D decoder 172. Method 700 may also be performed by some other type of tuner device. Method 700 may be a more detailed embodiment of method 600.

At step 710, an active 3D frame may be received by a tuner device. Referring to system 100 of FIG. 1, the active 3D frame may be received from television programming services system 140 via satellite 120 and end-user equipment 130 by tuner device 170. In other embodiments, a tuner device may receive the active 3D frame via broadcast television or a cable network. The active frame received at step 710 may be similar in format to active 3D frame 200 of FIG. 2. The received active frame may contain two images captured from different perspectives of the same scene. The two images may be horizontally adjacent. In some embodiments, the two images of the active 3D frame may be vertically adjacent.

At step 720, the first image of the 3D frame may be tinted. The first image may be tinted while it is part of the active 3D frame or may be tinted after being separated from the active 3D frame. In some embodiments, the color used for the tinting of the first image may be red. In other embodiments, it may be blue. Further, in other embodiments, other colors may be used. The color used for tinting may correspond to a color of a lens of a pair of passive 3D glasses to be used to view passive 3D images. For example, referring to FIG. 5, the color used to tint the first image may correspond to the color of either lens 520 or lens 530. To accomplish the tinting of the first image, a virtual box may be drawn over the area of the first image. The virtual box may be configured to display a certain color with a certain level of transparency. The effect of the virtual box being associated with a certain color at a certain level of transparency may result in the first image being tinted.

At step 730, the second image of the 3D frame may be tinted a color different than the first image of the 3D frame. The second image may be tinted while it is part of the active 3D frame or may be tinted after being separated from the active 3D frame. In some embodiments, the color used for the tinting of the second image may be blue. In other embodiments, it may be red. Further, in other embodiments, other colors may be used. The color used for tinting may correspond to a color of a lens of a pair of passive 3D glasses to be used to view passive 3D images. For example, referring to FIG. 5, the color used to tint the second image may correspond to the color of either lens 520 or lens 530 (e.g., the opposite lens of step 720). To accomplish the tinting of the second image, a second virtual box may be drawn over the area of the second image. The virtual box may be configured to display a certain color (different from the color of step 730) with a certain level of transparency (which may be the same transparency level used at step 730). The effect of the virtual box being associated with a certain color at a certain level of transparency may result in the second image being tinted.

At step 740, the first tinted image may be scaled for display. Each image present within the active 3D frame may be compressed horizontally, vertically, or otherwise compressed. For undistorted display, each of these images may be scaled for at least approximate undistorted display to an end-user via the end-user display device. At step 740, for example, the first tinted image may be scaled to at least approximately occupy the entire display area of the end-user display device. Referring to FIG. 2, if two images of an active 3D frame are horizontally adjacent to each other, scaling each image to the appropriate size may involve approximately doubling the horizontal scale of each image.

At step 750, the first tinted image may be displayed. Step 750 may involve the tuner device transmitting the first tinted image to an end-user display device. The end-user display device may then display the first tinted image. The first tinted image may be displayed for only a short period of time. For example, in some embodiments, 30, 60, or 120 tinted images may be displayed every second.

At step 760, the second tinted image may be scaled for display. The second tinted image may be scaled similarly to the first tinted image as performed at step 740.

At step 770, the second tinted image may be displayed. Step 770 may involve the tuner device transmitting the second tinted image to an end-user display device. The end-user display device may then display the second tinted image. The second tinted image may be displayed for only a short period of time. The second tinted image may be displayed shortly after the first tinted image. The first and second tinted images may be displayed in such rapid succession that to an end-user the first tinted image and the second tinted image appear to be displayed concurrently. In some embodiments, the first tinted image and the second tinted image may be overlaid and displayed concurrently. In such embodiments, steps 750 and 770 may be performed concurrently.

Method 700 may repeat rapidly. For example, to display 3D video (e.g., a television 3D show), a significant number of active 3D frames may be converted for display for passive 3D viewing every second. For example, in some embodiments, 30 or 60 active 3D frames may be converted every second. From these active 3D frames, 30, 60, or 120 (or some other number) tinted images may be displayed via the end-user display device every second.

Figure 8:
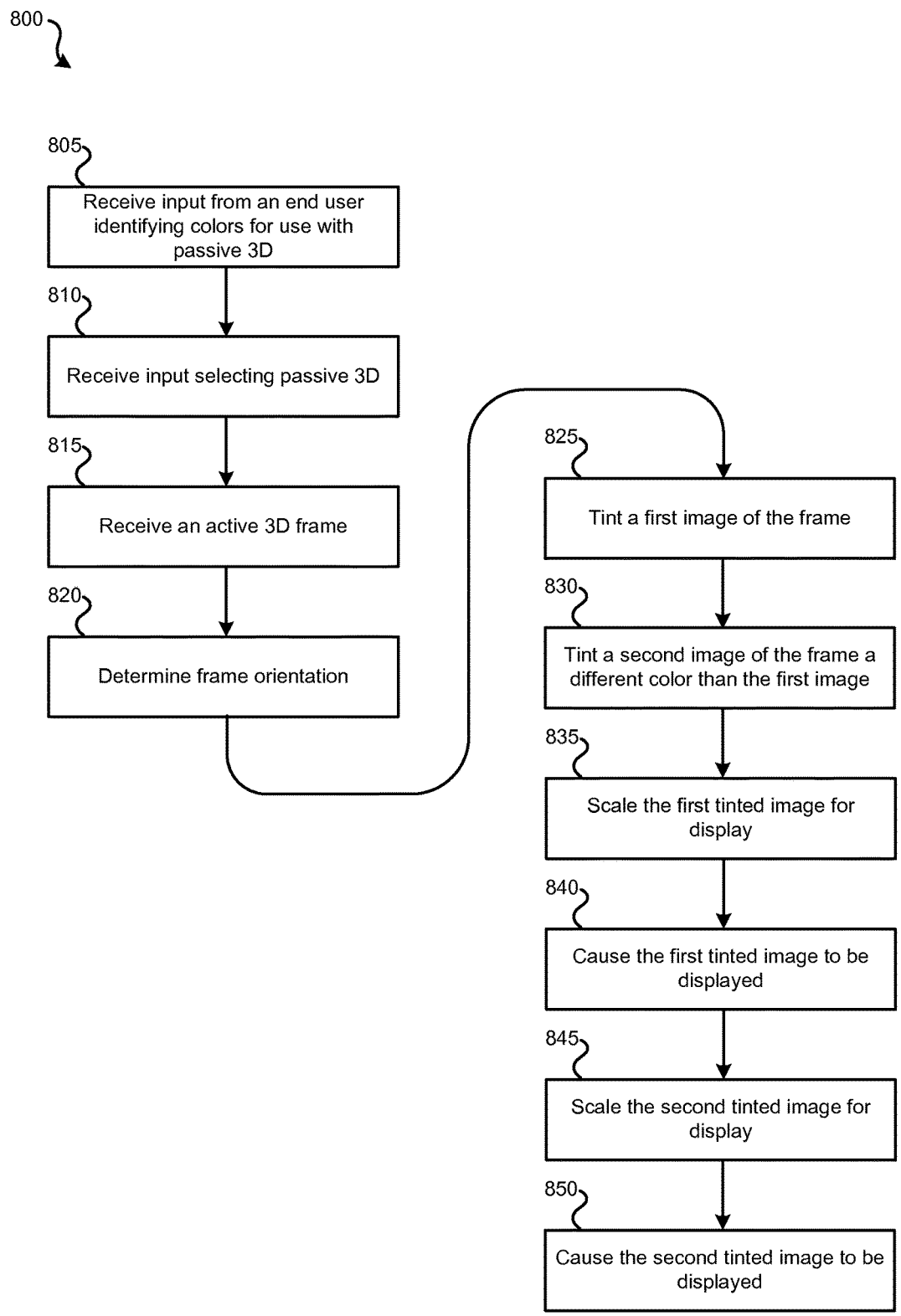
FIG. 8 illustrates yet another embodiment of a method for using an active 3D frame to create a passive 3D image.

FIG. 8 illustrates another embodiment of a method for using an active 3D frame to create a passive 3D image. Method 800 may be performed by system 100. Alternatively, method 800 may be performed by some other system that is configured to use an active 3D frame to create a passive 3D image for display by an end-user display device. More specifically, each step of method 800 may be performed by a tuner device. Referring to system 100, method 800 may be performed by tuner device 170, which may be executing 3D converter 172. Method 800 may also be performed by some other type of tuner device. Method 800 may be a more detailed embodiment of method 600 and/or method 700.

At step 805, input may be received from an end-user identifying colors to be used for passive 3D. This may involve the end-user specifying the colors of a pair of passive 3D glasses. In some embodiments, the end-user may use an input device, such as user input device 175 of FIG. 1 to provide input. The end-user may have the option of selecting predefined color combinations used by passive 3D glasses. For example, some common passive 3D glasses may use red and blue lenses. As such, the end-user may have an option of selecting red and blue passive 3D glasses from a menu displayed by the end-user display device. In some embodiments, an end-user may be presented with one or more color wheels (or some other arrangement to select colors) to manually select the color associated with each lens of the end-user's passive 3D glasses.

Further, input received from the end-user identifying colors may be used to fine-tune the tinting used by method 800. For example, while many common passive 3D glasses use red and blue lenses, the exact shade of red and the shade of blue used may vary by make and/or model of the 3D passive glasses. Further, colors as displayed by an end-user device may vary according to the make, model, and/or settings of the end-user display device. As such, at step 805, the end-user may fine-tune the tinting used by the tuner device for the tinting of images to be viewed in conjunction with the passive 3D glasses.

At step 810, input may be received by the tuner device indicating that active 3D frames should be converted for viewing using passive 3D glasses. For example, an end-user may view an end-user display device using active 3D technology. However, at certain times, the end-user may desire to switch to passive 3D, such as when more persons want to watch the end-user display device than the number of active 3D glasses available. Referring to system 100, an end-user may provide input via user input device 175 to tuner device 170. In some embodiments, the user input device 175 may have a button that permits an end-user to toggle between active 3D and passive 3D. In other embodiments, the user input device may be used to select passive 3D from a menu displayed by tuner device 170 via end-user display device 180.

At step 815, an active 3D frame may be received by a tuner device. Referring to system 100 of FIG. 1, the active 3D frame may be received from television programming services system 140 via satellite 120 and end-user equipment 130 by tuner device 170. In other embodiments, a tuner device may receive the active 3D frame via broadcast television or a cable network. The active frame received at step 815 may be similar in format to active 3D frame 200 of FIG. 2. The received active frame may contain two images captured from different perspectives of the same scene. The two images may be horizontally adjacent. In some embodiments, the two images of the active 3D frame may be vertically adjacent.

At step 820, the orientation of the active 3D frame may be determined. This may involve determining whether the two images within the active 3D frame are horizontally adjacent or vertically adjacent.

At step 825, the first image of the 3D frame may be tinted. The first image may be tinted while it is part of the active 3D frame or may be tinted following separation from the active 3D frame. The portion of the active frame received at step 815 that is identified as the first image may be at least partially based on the frame orientation determined at step 820. The color used for tinting the first image may be based on the input received from the end-user identifying colors for use with passive 3D of step 805. In some embodiments, the color used for the tinting of the first image may be red. In other embodiments, it may be blue. Further, in other embodiments, some other color may be used. The color used for tinting may correspond to a color of a lens of a pair of passive 3D glasses to be used to view passive 3D images. For example, referring to FIG. 5, the color used to tint the first image may correspond to the color of either lens 520 or lens 530. To accomplish the tinting of the first image, a virtual box may be drawn over the first image of the active 3D frame. The virtual box may be configured to display a certain color with a certain level of transparency. The effect of the virtual box being associated with a certain color at a certain level of transparency may be the first image being tinted. In other embodiments, the first image may be separated from the active 3D frame and subsequently tinted.

At step 830, the second image of the 3D frame may be tinted. The second image may be tinted while it is part of the active 3D frame or may be tinted following separation from the active 3D frame. The portion of the active frame received at step 815 that is identified as the second image may be at least partially based on the frame orientation determined at step 820. The color used for tinting the second image may be at least partially based on the input received from the end-user identifying colors for use with passive 3D of step 805. In some embodiments, the color used for the tinting of the second image may be blue. In other embodiments, it may be red. Further, in other embodiments, some other color may be used. The color used for tinting may correspond to a color of a lens of a pair of 3D glasses to be used to view passive 3D images. For example, referring to FIG. 5, the color used to tint the second image may correspond to the color of either lens 520 or lens 530 (e.g., the opposite lens of step 720). To accomplish the tinting of the second image, a second virtual box may be drawn over the second image. The virtual box may be configured to display a certain color (different from the color of step 825) with a certain level of transparency (which may be the same transparency level used at step 825). The effect of the virtual box being associated with a certain color at a certain level of transparency may result in the second image being tinted.

At step 835, the first tinted image may be scaled for display. Each image present within the active 3D frame may be compressed horizontally and/or vertically such that two images are within the active 3D frame. For undistorted display, each of these images may need to be scaled for at least approximate undistorted display to an end-user via the end-user display device. The scaling may at least be partially based on the determined frame orientation of step 820. At step 835, for example, the first tinted image may be scaled to at least approximately occupy the entire display area of the end-user display device. Referring to FIG. 2, if two images of an active 3D frame are horizontally adjacent to each other, scaling each image to the appropriate size may involve doubling the horizontal size of each image.

At step 840, the first tinted image may be displayed. Step 840 may involve the tuner device transmitting the first tinted image to an end-user display device for display. The end-user display device may display the first tinted image. The first tinted image may be displayed for only a short period of time. For example, in some embodiments, 30 or 60 tinted images may be displayed every second.

At step 845, the second tinted image may be scaled for display. The second tinted image may be scaled similarly to the first tinted image as performed at step 840. Again, the scaling may at least be partially based on the determined frame orientation of step 820.

At step 850, the second tinted image may be displayed. Step 850 may involve the tuner device transmitting the second tinted image to the end-user display device. The end-user display device may then display the second tinted image. The second tinted image may be displayed for only a short period of time. The second tinted image may be displayed shortly after the first tinted image. The first and second tinted images may be displayed in rapid succession such that to an end-user, the first tinted image and the second tinted image appear to be displayed concurrently. In some embodiments, the first tinted image and the second tinted image may be overlaid and displayed concurrently. As such, in such embodiments, steps 750 and 770 may be performed concurrently.

As viewed by an end-user through a pair of passive 3D glasses, each image may only be substantially visible to one of the end-user's eyes. As such, since each image of the active 3D frame received at step 815 is intended to capture different perspectives of the same scene (one for each eye), the end-user may experience an impression of viewing the scene as displayed by the end-user display device in 3D.

Method 800 may repeat rapidly. For example, to display motion video (e.g. a television show), a significant number of active 3D frames may be converted for display using passive 3D every second. For example, in some embodiments, 30, 60 (or some other number) of active 3D frames may be converted every second. From these active 3D frames, 30, 60, 120 (or some other number) of tinted images may be displayed via the end-user display device every second.

Figure 9:
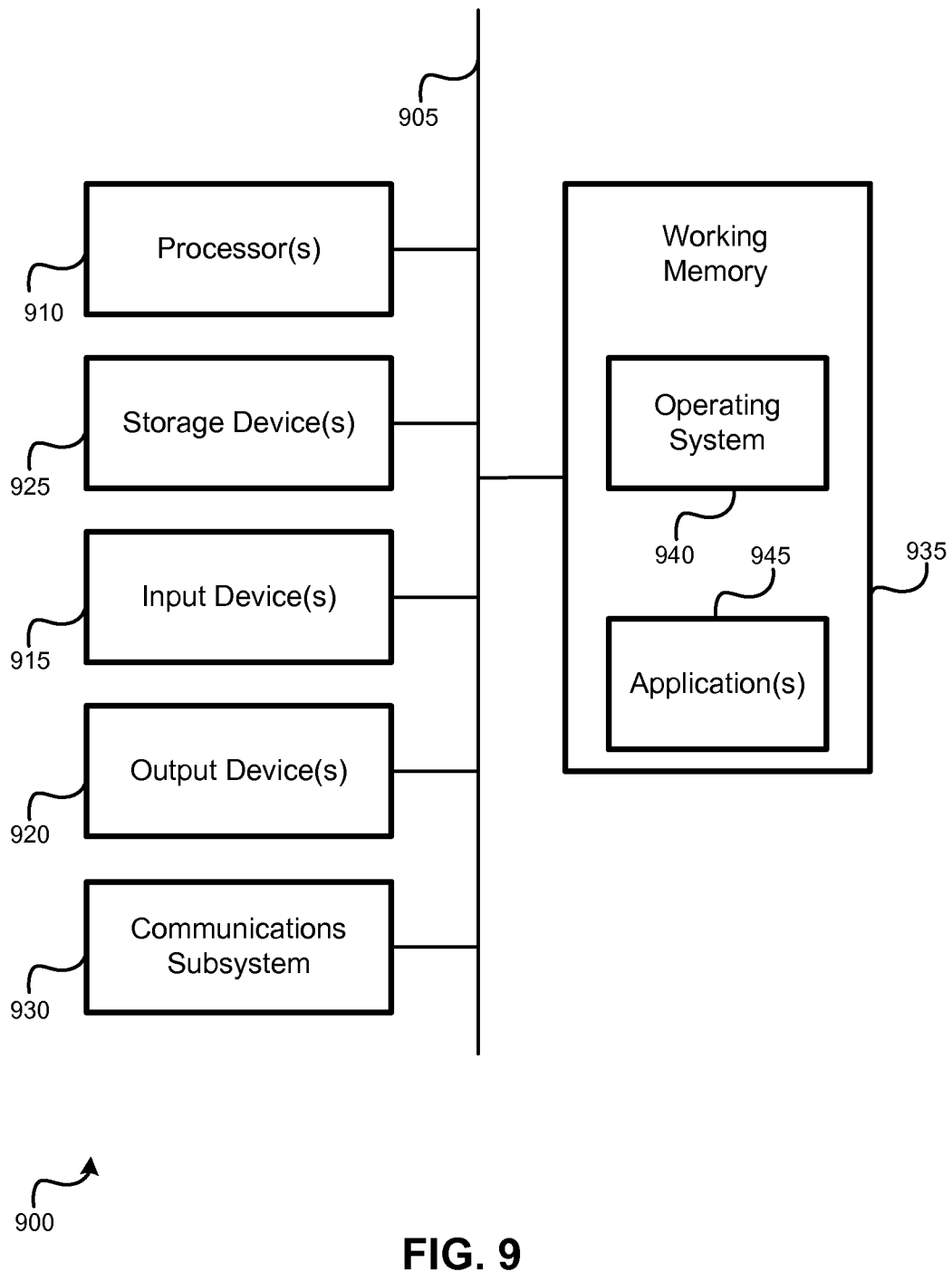
FIG. 9 illustrates an embodiment of a computer system.

A computer system as illustrated in FIG. 9 may be incorporated as part of the previously described computerized devices. For example, computer system 900 can represent some of the components of the tuner devices and/or the television programming service system discussed in this application. FIG. 9 provides a schematic illustration of one embodiment of a computer system 900 that can perform the methods provided by various other embodiments, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for using an active 3D frame to create passive 3D images, the method comprising:
    causing, by a tuner device, an end-user display device to present user-selectable options to allow:
        user toggling between an active 3D display operations and passive 3D display operations of the tuner device, wherein user toggling to the passive 3D display operations initiates conversion operations that convert a plurality of active 3D frames to a plurality of passive 3D images;
        user configuration of the conversion operations, wherein the user-selectable options comprise an arrangement of selectable colors to permit user selection of shades to indicate shades of lenses of passive 3D glasses and/or shades of the end-user display device;
    receiving, by the tuner device, an indication of the user toggling to the passive 3D display operations to initiate the conversion operations;

receiving, by the tuner device, specifications of the user configuration of the conversion operations, the specifications comprising selections corresponding to a first color and a second color from the arrangement of selectable colors;

consequent to the user toggling to the passive 3D display operations and the receiving the specifications, performing the converting operations at least in part by:

receiving, by the tuner device, the active 3D frame, wherein:

the active 3D frame comprises a first perspective image and a second perspective image, the first perspective image representative of a different perspective than the second perspective image;

determining, by tuner device, a mutual orientation of the first perspective image and the second perspective image;

tinting, by the tuner device, the first perspective image with a first color based at least in part on drawing a first virtual box over a first area of the first perspective image to form a tinted first perspective image comprising the first virtual box;

tinting, by the tuner device, the second perspective image with a second color, wherein the first color is different from the second color based at least in part on drawing a second virtual box over a second area of the second perspective image to form a tinted second perspective image comprising the second virtual box;

based at least in part on the determined mutual orientation, rescaling, by the tuner device, the tinted first perspective image comprising the first virtual box and the tinted second perspective image comprising the second virtual box;

generating, by the tuner device, a first passive 3D frame comprising the tinted first perspective image in the first color;

generating, by tuner device, a second passive 3D frame comprising the tinted second perspective image in the second color;

causing, by the tuner device, the first perspective image tinted with the first color of the first passive 3D frame to be displayed; and causing, by the tuner device, the second perspective image tinted with the second color of the second passive 3D frame to be displayed after the first perspective image tinted with the first color of the first passive 3D frame is displayed.

2. The method for using the active 3D frame to create the passive 3D images of claim 1, wherein the causing the second perspective image tinted with the second color of the second passive 3D frame to be displayed occurs after the first perspective image tinted with the first color of the first passive 3D frame has been displayed.

3. The method for using the active 3D frame to create the passive 3D images of claim 2, wherein the first perspective image tinted with the first color of the first passive 3D frame and the second perspective image tinted with the second color of the second passive 3D frame are caused to be displayed in succession such that the first perspective image tinted with the first color of the first passive 3D frame and the second perspective image tinted with the second color of the second passive 3D frame appear displayed concurrently to an end-user.

4. The method for using the active 3D frame to create the passive 3D images of claim 1, wherein:

the first color matches a first lens's color of a first lens, the first lens being part of a pair of passive 3D glasses configured to be worn by an end-user; and the second color matches a second lens's color of a second lens, the second lens being part of the pair of passive 3D glasses configured to be worn by the end-user.

5. The method for using the active 3D frame to create the passive 3D images of claim 4, further comprising:

receiving, by the tuner device, input that indicates the first lens's color;

receiving, by the tuner device, input that indicates the second lens's color;

selecting, by the tuner device, the first color based on the input that indicates the first lens's color; and selecting, by the tuner device, the second color based on the input that indicates the second lens's color.

6. The method for using the active 3D frame to create the passive 3D images of claim 1, wherein:

the causing, by the tuner device, the first perspective image tinted with the first color of the first passive 3D frame to be displayed comprises transmitting a first set of information to an end-user display device not configured to display in active 3D; and the causing, by the tuner device, the second perspective image tinted with the second color of the second passive 3D frame to be displayed comprises transmitting a second set of information to the end-user display device not configured to display in active 3D.

7. A system configured to use an active 3D frame to create passive 3D images, the system comprising:

a tuner device communicatively coupled with an end-user display device, wherein the tuner device is configured to:

cause an end-user display device to present user-selectable options to allow:

user toggling between an active 3D display operations and passive 3D display operations of the tuner device, wherein user toggling to the passive 3D display operations initiates conversion operations that convert a plurality of active 3D frames to a plurality of passive 3D images;

user configuration of the conversion operations, wherein the user-selectable options comprise an arrangement of selectable colors to permit user selection of shades to indicate shades of lenses of passive 3D glasses and/or shades of the end-user display device;

receive an indication of a user selection of the user toggling to the passive 3D display operations to initiate the conversion operations;

receive specifications of the user configuration of the conversion operations, the specifications comprising selections corresponding to a first color and a second color from the arrangement of selectable colors;

consequent to the user toggling to the passive 3D display operations and the receiving the specifications, performing the converting operations at least in part by:

receiving the active 3D frame, wherein:

the active 3D frame comprises a first perspective image and a second perspective image, the first perspective image representative of a different perspective than the second perspective image;

determining a mutual orientation of the first perspective image and the second perspective image;

tinting the first perspective image with a first color based at least in part on drawing a first virtual box over a first area of the first perspective image to form a tinted first perspective image comprising the first virtual box;

tinting the second perspective image with a second color based at least in part on drawing a second virtual box over a second area of the second perspective image to form a tinted second perspective image comprising the second virtual box, wherein the first color is different from the second color;

based at least in part on the determined mutual orientation, rescaling the tinted first perspective image comprising the first virtual box and the tinted second perspective image comprising the second virtual box;

generating a first passive 3D frame comprising the tinted first perspective image in the first color;

generating a second passive 3D frame comprising the tinted second perspective image in the second color;

transmitting the first perspective image tinted with the first color of the first passive 3D frame to the end-user display device; and transmitting the second perspective image tinted with the second color of the second passive 3D frame to the end-user display device to cause the second perspective image tinted with the second color of the second passive 3D frame to be displayed after the first perspective image tinted with the first color of the first passive 3D frame is displayed.

8. The system configured to use the active 3D frame to create the passive 3D images of claim 7, wherein the tuner device is configured to transmit the second perspective image tinted with the second color of the second passive 3D frame to the end-user display device after the first perspective image tinted with the first color of the first passive 3D frame has been transmitted to the end-user display device.

9. The system configured to use the active 3D frame to create the passive 3D images of claim 8, wherein the first perspective image tinted with the first color of the first passive 3D frame and the second perspective image tinted with the second color of the second passive 3D frame are displayed in rapid succession by the end-user display device such that the first perspective image tinted with the first color of the first passive 3D frame and the second perspective image tinted with the second color of the second passive 3D frame appear displayed concurrently to an end-user.

10. The system configured to use the active 3D frame to create the passive 3D images of claim 7, further comprising:
a pair of passive 3D glasses, wherein:
the first color matches a first lens's color of a first lens of the pair of passive 3D glasses configured to be worn by an end-user; and
the second color matches a second lens's color of a second lens of the pair of passive 3D glasses configured to be worn by the end-user.

11. The system configured to use the active 3D frame to create the passive 3D images of claim 10, wherein the tuner device is further configured to:
receive input that indicates the first lens's color;
receive input that indicates the second lens's color;
select the first color based on the input that indicates the first lens's color; and
select the second color based on the input that indicates the second lens's color.

12. The system configured to use the active 3D frame to create the passive 3D images of claim 7, wherein the end-user display device is not configured to display in active 3D.

13. A non-transitory, computer-readable medium comprising instructions configured to cause a computer to:
receive an indication of a user selection of an option to toggle between active 3D display and passive 3D display;
cause an end-user display device to present user-selectable options to allow:
user toggling between an active 3D display operations and passive 3D display operations of a tuner device, wherein user toggling to the passive 3D display operations initiates conversion operations that convert a plurality of active 3D frames to a plurality of passive 3D images;
user configuration of the conversion operations, wherein the user-selectable options comprise an arrangement of selectable colors to permit user selection of shades to indicate shades of lenses of passive 3D glasses and/or shades of the end-user display device;
receive an indication of a user selection of the user toggling to the passive 3D display operations to initiate the conversion operations;
receive specifications of the user configuration of the conversion operations, the specifications comprising selections corresponding to a first color and a second color from the arrangement of selectable colors;
consequent to the user toggling to the passive 3D display operations and the receiving the specifications, performing the converting operations at least in part by:
receiving an active 3D frame, wherein:
the active 3D frame comprises a first perspective image and a second perspective image, the first perspective image representative of a different perspective than the second perspective image;
determining a mutual orientation of the first perspective image and the second perspective image;
tinting the first perspective image with a first color based at least in part on drawing a first virtual box over a first area of the first perspective image to form a tinted first perspective image comprising the first virtual box;
tinting the second perspective image with a second color based at least in part on drawing a second virtual box over a second area of the second perspective image to form a tinted second perspective image comprising the second virtual box, wherein the first color is different from the second color;
based at least in part on the determined mutual orientation, rescaling the tinted first perspective image comprising the first virtual box and the tinted second perspective image comprising the second virtual box;
generating a first passive 3D frame comprising the tinted first perspective image in the first color;
generating a second passive 3D frame comprising the tinted second perspective image in the second color;
transmitting the first perspective image tinted with the first color of the first passive 3D frame to an end-user display device; and
transmitting the second perspective image tinted with the second color of the second passive 3D frame to the end-user display device to cause the second perspective image tinted with the second color of the second passive 3D frame to be displayed after the first perspective image tinted with the first color of the first passive 3D frame is displayed.

14. The non-transitory, computer-readable medium of claim 13, wherein the instructions further comprise instructions configured to cause the computer to transmit the second perspective image tinted with the second color of the second passive 3D frame to the end-user display device after the first perspective image tinted with the first color of the first passive 3D frame has been transmitted to the end-user display device.

15. The non-transitory, computer-readable medium of claim 14, wherein the instructions configured to transmit the first perspective image tinted with the first color of the first passive 3D frame and the second perspective image tinted with the second color of the second passive 3D frame to the end-user display device are performed in rapid succession such that the first perspective image tinted with the first color of the first passive 3D frame and the second perspective image tinted with the second color of the second passive 3D frame appear displayed concurrently by the end-user display device to an end-user.

16. The non-transitory, computer-readable medium of claim 13, wherein the instructions further comprise instructions configured to cause the computer to:

receive input that indicates a first lens's color of a first lens;

receive input that indicates a second lens's color of a second lens, the first lens and the second lens being part of a pair of passive 3D glasses;

select the first color based on the input that indicates the first lens's color; and select the second color based on the input that indicates the second lens's color.

17. The non-transitory, computer-readable medium of claim 13, wherein the end-user display device is not configured to display in active 3D.

18. The method for using the active 3D frame to create the passive 3D images of claim 5, wherein the causing the end-user display device to present the arrangement of selectable colors comprises causing presentation of the arrangement of selectable colors as one or more color wheels to permit the user selection of the shades to indicate the shades of the lenses of passive 3D glasses and/or the shades of the end-user display device.

19. The method for using the active 3D frame to create the passive 3D images of claim 18, wherein:

the active 3D frame is specified for presentation according to a first number of active 3D frames per second; and the causing the first perspective image tinted with the first color and the second perspective image tinted to be displayed comprises causing display according to a second number of images per second;

wherein the second number is different than the first number.

* * * * *